United States Patent
Kim et al.

(10) Patent No.: US 7,426,200 B2
(45) Date of Patent: Sep. 16, 2008

(54) WIRELESS COMMUNICATION APPARATUS AND A METHOD USING THE SAME

(75) Inventors: Yong-suk Kim, DaeJeon (KR); Jong-hun Park, Seoul (KR)

(73) Assignee: Samsung Electronics Co., Ltd., Suwon (KR)

(*) Notice: Subject to any disclaimer, the term of this patent is extended or adjusted under 35 U.S.C. 154(b) by 894 days.

(21) Appl. No.: 10/294,547

(22) Filed: Nov. 15, 2002

(65) Prior Publication Data

US 2003/0108010 A1 Jun. 12, 2003

(30) Foreign Application Priority Data

Dec. 11, 2001 (KR) ............... 2001-78273

(51) Int. Cl.
*H04Q 7/00* (2006.01)
(52) U.S. Cl. ...................... 370/333; 370/332
(58) Field of Classification Search ............ 455/452.1, 455/452.2; 370/332, 333
See application file for complete search history.

(56) References Cited

U.S. PATENT DOCUMENTS

| | | | |
|---|---|---|---|
| 4,841,526 A | 6/1989 | Wilson et al. | |
| 5,699,364 A | 12/1997 | Sato et al. | |
| 6,988,227 B1 * | 1/2006 | Perrott | 714/704 |
| 2003/0046708 A1 * | 3/2003 | Jutzi | 725/120 |
| 2004/0185873 A1 * | 9/2004 | Gilkes et al. | 455/456.2 |

FOREIGN PATENT DOCUMENTS

| | | |
|---|---|---|
| CN | 1285101 A | 2/2001 |
| EP | 1120932 | 8/2001 |
| JP | 4-8030 A | 1/1992 |

OTHER PUBLICATIONS

European Search Report dated Aug. 3, 2006.
Bluetooth, Short-distance Wireless Communication Standards Bluetooth, Oct. 2000, vol. 32, No. 10.

* cited by examiner

*Primary Examiner*—Duc M. Nguyen
*Assistant Examiner*—Dai Phuong
(74) *Attorney, Agent, or Firm*—Sughrue Mion, PLLC

(57) ABSTRACT

A wireless communication apparatus and a method using the same are capable of transmitting data while changing a packet type according to a packet error rate. The wireless communication apparatus has a transceiving portion for receiving and transmitting a data packet from and to an external device, a packet type selecting portion, a calculation portion for calculating a packet error rate and transmission time of a transmitted data packet, and a control portion for controlling the packet type selecting portion to select a proper packet type for a transmission of a next data packet based on the calculated packet error rate so that the data can be transmitted within a minimum time and with a maximum efficiency. The wireless communication apparatus maximizes data transmission efficiency since it can transmit the data packet while changing the packet type adaptively to the packet error rate.

28 Claims, 7 Drawing Sheets

WIRELESS COMMUNICATION APPARATUS AND A METHOD USING THE SAME

BACKGROUND OF THE INVENTION

1. Field of the Invention

The present invention relates to a wireless communication apparatus and a method using the same to transmit data, and more particularly to a wireless communication apparatus and a method thereof capable of selectively transmitting data of a certain packet type. The present application is based on Korean Patent Application No. 2001-78273, filed Dec. 11, 2001, which is incorporated herein by reference.

2. Description of the Related Art

Infrared data association (IrDA), wireless LAN (IEEE802.11), Bluetooth and shared wireless access protocol (SWAP) are well-known technologies of remote wireless data communication.

Among these, Bluetooth is a code name of wireless communication technology that covers various fields like electric communication, networking, computing, and consumer goods. In Bluetooth technology, a connection of multiple cables within short distances is substituted with one wireless connection. For example, the Bluetooth wireless technology applied in the mobile phone and laptop computer enables the use of the mobile phone and laptop in connection with each other without a cable. The Bluetooth system can include almost all digital devices, such as printers, personal digital assistants (PDA), desktop computers, faxes, keyboards and joysticks or the like.

Generally, Bluetooth covers a maximum of 10 m of transmittable distance at a maximum 1 Mbps of data transmission speed. The transmission speed of 1 Mbps is achieved easily and cheaply in the industrial scientific medical (ISM) frequency band of 2.4 GHz which is permitted to be used without any license. The distance of 10 m is enough to reach from the desktop computer in the office to the portable device. Bluetooth is made to operate efficiently in a radio frequency environment where there is a lot of noise. Thus, Bluetooth adopts a frequency hopping 1600 times per second, to enable stable data transmission even in the wireless frequency band where there is a lot of noise. The frequency hopping is one of the spread spectrum technologies like the direct sequence. However, the frequency hopping distinguishes from the direct sequence in that the carrier signal is transmitted, changing the frequencies many times in every second.

In addition to one-to-one communication, the Bluetooth system also supports one-to-multi communication. As shown in FIG. 1, in the Bluetooth system, several piconets can be constructed and connected with each other. Here, the respective piconets are distinguished from each other by a frequency hopping order. The piconet is formed with one master and more than one slave, and serves as a basic unit of the Bluetooth system. One piconet can include one master and a maximum of seven (7) slaves. Basically, the master and the slaves communicate bi-directionally using a time division duplex (TDD) based on a basic unit of one (1) hopping slot of 625 µs (625 µs=$\frac{1}{1600}$ sec). The network connected with a plurality of piconets altogether is called a 'scatternet'.

FIG. 2 is a view showing communication between the master and slaves based on the TDD. Referring to FIG. 2, one channel, which is allotted to a time slot, is 625 µs long. The number of time slots is determined according to the Bluetooth clock of the master of the piconet. Also, the master and the slaves can transmit a packet using the time slot. In other words, the master transmits the packet when the time slots are even-number, while the slaves transmit the packet when the time slots are odd-number. Further, the packet intended to be transmitted from the master or the slaves has to be within five (5) time slots. In a transmission of multiple slots, the hopping frequency of the time slot where the packet is initially transmitted, is continuously used for all the packets. Here, the 'packet' is the unit of data transmitted in the piconet channel.

Each packet consists of three segments, that is, access code, header and payload. The access code is used to detect the existence of a packet and to transmit the packet to a particular device. The header contains control information concerning the packet and link, such as the slave address intended by the packet. The payload contains message information when the message from the logical link controller and adaptation protocol (L2CAP) or from the link manager (LM) is an upper layer protocol message, and contains data when the message from the L2CAP or from the LM is the data stored in a stack.

The access code and the header have fixed size, usually 72 bits and 54 bits, respectively. The payload is comprised of 0 through 2745 bits. In order to ensure a time for the transmitting/receiving devices to tune the frequency of the channel, however, the size of the packet should be limited to 366 bits. Also, since the packet header needs to be included in the packet, the payload can use only 216 bits. When the forward error correction (FEC) is used for the error correction, due to error code, only 136 bits can be used as the available payload. Among the packet types that use only one slot in the asynchronous connectionless link (ACL), the packet type that does not use the FEC is called 'DH1 (Data-High rate, 1 slot)', while the packet type that uses the FEC is called 'DM1 (Data-Medium rate, 1 slot)'. Since the DH packet does not use the FEC for an error correction, it has a higher transmission rate than the DM packet. Here, the 'ACL connection' refers to a link used by the Bluetooth system for a data transmission.

For a more efficient data transmission, Bluetooth defines the types of the packets according to the numbers of slots they use: the packet type that uses three (3) slots is DH3 packet type, and the packet that uses five (5) slots is DH5 packet type. The DH3 and DH5 packet types are more efficient since they transmit a lot more information for one slot than the DH1 packet type does. There are DM3 and DM5 corresponding to the DM1. The DM1 packet only transmits data information. As described above, there are six (6) types of packets for data transmission, and each packet type is distinguished from each other by the length and whether it corrects the error or not. The six packet types are shown in the Table 1 below:

TABLE 1

| Type | Maximum Payload (byte) | FEC | Maximum Rates (Kbps) |
|------|------------------------|-----|----------------------|
| DM1  | 17                     | 0   | 108.8                |
| DH1  | 27                     | X   | 172.8                |
| DM3  | 121                    | 0   | 387.2                |
| DH3  | 183                    | X   | 585.6                |
| DM5  | 224                    | 0   | 477.8                |
| DH5  | 339                    | X   | 723.2                |

According to the error rate of the channel, each of the six (6) packet types for data transmission shows different performance. In the case of no error occurrence, the DH5 packet type proves most efficient since the DH5 type can transmit the largest information in a unit slot. If there is increased bit error rate, the error rate of the DH5 packet type increases more rapidly than the error rates of other packet types of smaller sizes. In other words, the packet of larger size may have greater data transmission rate, but it also has a greater packet error rate. Conversely, the packet of smaller size has less packet error rate, but it also has a lower data transmission rate.

In the conventional wireless communication apparatus, the packet types of DM1, DH1, DM3, DH3, DM5 and DH5 are selectively used. Accordingly, there have been problems that the device cannot flexibly adapt to the change of packet error rates with respect to the transmitted data packet, and transmission efficiency deteriorates.

SUMMARY OF THE INVENTION

The present invention is made to overcome the above-mentioned problems of the related art, and accordingly, it is an object of the present invention to provide a wireless communication apparatus and a method using the same capable of dynamically changing a data packet type into a type suitable to a packet error rate of the data packet being transmitted.

The above object is accomplished by a wireless communication apparatus according to the present invention, including a transceiving portion for receiving a data packet from an external device and transmitting a data packet to the external device; a packet type selecting portion for selecting a packet type for the data packet; a calculation portion for calculating a packet error rate and transmission time of a transmitted data packet; and a control portion for controlling the packet type selecting portion so that a proper packet type can be selected, the proper packet type for a transmission of a next data packet based on the calculated packet error rate and the transmission time within a minimum time and with a maximum efficiency. The control portion controls the transceiving portion to transmit the following data packet according to the selected packet type.

The wireless communication apparatus according to the present invention further includes a detection portion for detecting a bit error rate of the transmitted data packet, and the calculation portion calculates the packet error rate based on the detected bit error rate according to the following Equation 1:

$$PER(X) = 1 - (1-BER)^{amount\ of\ data\ bit\ of\ packet\ type\ X} \quad \text{[Equation 1]}$$

where, PER(X) is the packet error rate of the packet type X, and BER is a current bit error rate.

Further, the calculation portion calculates the transmission time by the following Equation 2:

Transmission time=$1/(1-PER)\times$number of packets$\times$ length of packets/bandwidth=$1/(1-PER)\times$length of message/number of bits per packet$\times$(slot per packet+1)$\times$length of slot/bandwidth=$1/(1-PER)\times$ length of message/efficiency/bandwidth    [Equation 2]

where, "slot per packet+1" is the summation of the number of slots occupied by one packet plus one slot for a response, "length of slot" is the length of slots at a bit unit, and "efficiency" is a proportion of amount of information included in one slot.

The controller controls the packet type selecting portion to select the packet type of largest available bandwidth by comparing available bandwidths of the respective packet types. The controller adjusts up a threshold of the packet error rate for a transition when the selected packet type is bigger than the previous packet type, while it adjusts down a threshold of the packet error rate for a transition when the selected packet type is smaller than the previous packet type.

The calculation portion calculates the available bandwidth by multiplying the efficiency of the packet type X by the $\{1-PER(X)\}$.

According to the present invention, the wireless communication apparatus adopts a wireless communication method comprising the steps of transmitting a data packet to an external device, and receiving a data packet from the external device; calculating a packet error rate and transmission time of the transmitted data packet; selecting a packet type for a transmission of a next data packet based on the packet error rate and for the transmission within a minimum time and with a maximum efficiency; and controlling transmission of the next data packet according to the selected packet type.

Accordingly, according to the packet error rate of the transmitted data packet, the wireless communication apparatus can select the most suitable packet type for data transmission, thereby improving the system efficiency.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE PREFERRED EMBODIMENT

A wireless communication apparatus and a method using the same in accordance with preferred embodiment of the present invention will now be described in detail with reference to the accompanying drawings.

Figure 1:
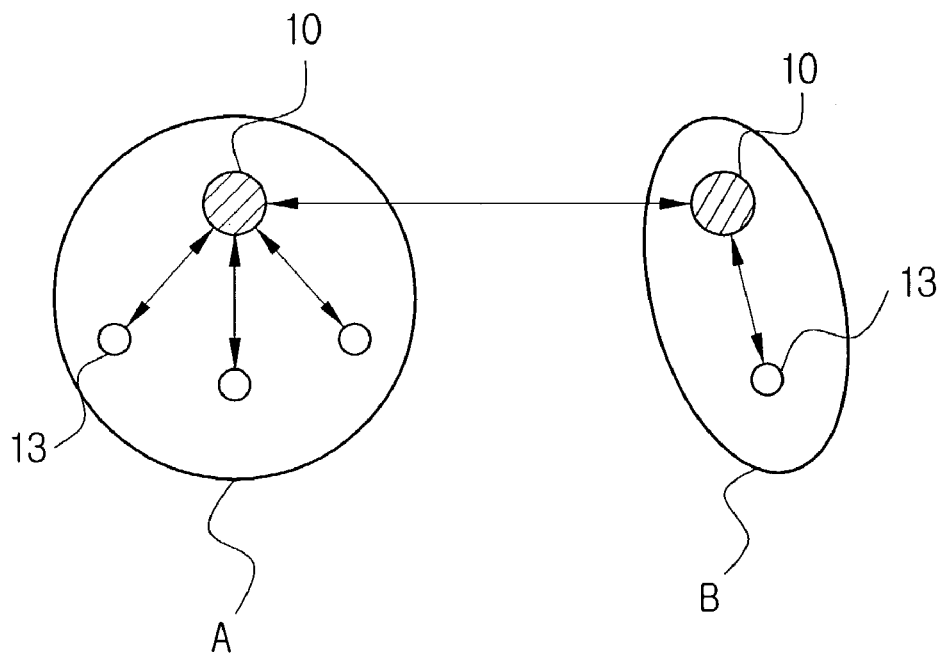
FIG. 1 is a view showing a scatternet of the Bluetooth system.
Figure 2:
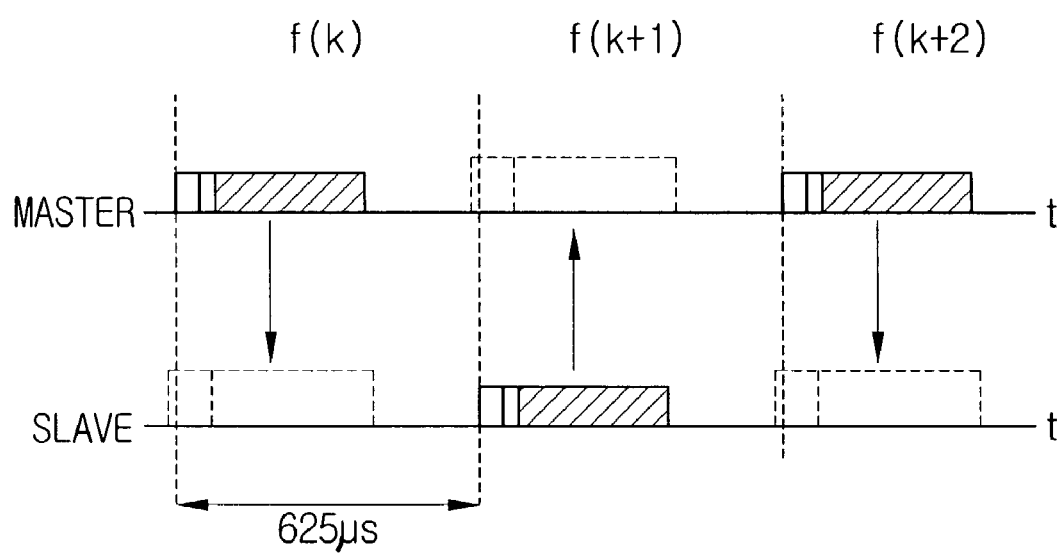
FIG. 2 is a view showing communication between a master and a slave based on the time division duplex (TDD)
Figure 3:
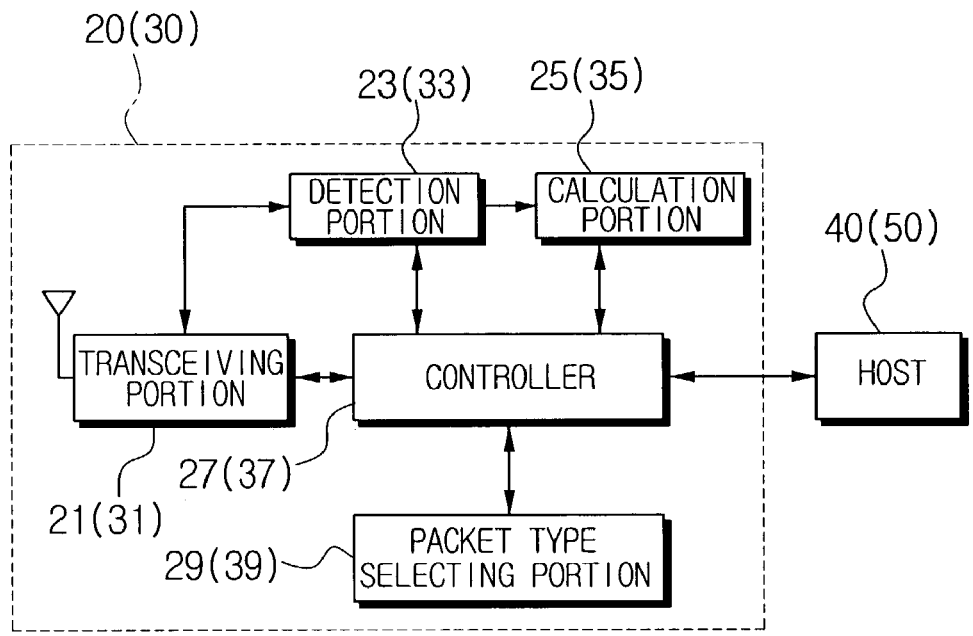
FIG. 3 is a block diagram schematically showing a wireless communication apparatus according to the present invention.
Figure 4:
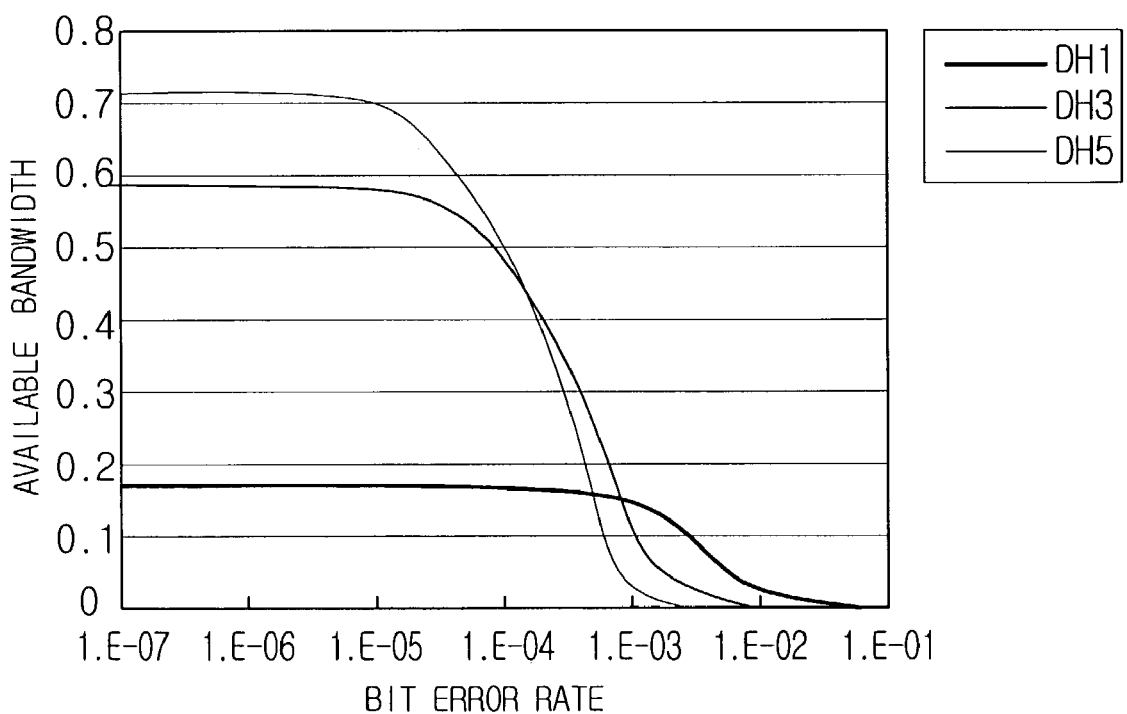
FIG. 4 is a view showing the available bandwidth for the DH packet types for comparison.

FIG. 3 is a block diagram schematically showing a wireless communication apparatus according to the present invention. As shown in FIG. 3, the wireless communication apparatus 20 and 30 includes a transceiving portion 21 and 31, a detection portion 23 and 33, a calculation portion 25 and 35, a controller 27 and 37 and a packet type selecting portion 29 and 39. Further, the controller 27 and 37 of the wireless communication apparatus 20 and 30 is connected to a host 40 and 50. Here, two reference numbers are collectively used to denote one element to distinguish the wireless communication apparatus 20 operating as a slave from the wireless communication apparatus 30 operating as the master. Also, since the respective elements of the wireless communication apparatus 20 and 30 perform the same functions regardless of whether the wireless communication apparatus 20 and 30 operates as a master or a slave, the description will be made below by mainly referring to the wireless communication apparatus 20 that is operating as the slave.

The transceiving portion 21 processes the externally-received signal, like radio frequency signals (RF), and sends out a data packet for transmission. The packet type selecting portion 29 selects the packet type for the data packet. According to the use of forward error correction (FEC) for error correction, the packet types are mainly divided into the DH packet types and DM packet types. Then, according to the number of slots occupied by the packet types, the packets types are divided respectively into DH1, DH3 and DH5, and DM1, DM3 and DM5. Reference to Table 1 is made for the maximum payload and rate of the respective packet type.

The detection portion 23 detects the bit error rate (BER) of the transmitted data packet. The BER is used to measure the quality of the link. The calculation portion 25 calculates the packet error rate of the transmitted data packet and also the transmission time. The packet error rate of the packet type X is obtained according to Equation 1:

$$PER(X) = 1 - (1 - BER)^{\text{amount of data bit of packet type } X} \quad \text{[Equation 1]}$$

where, 'PER(X)' is the packet error rate of the packet type X, and 'BER' is the current bit error rate. The transmission time is obtained by Equation 2:

Transmission time=1/(1−PER)×number of packets× length of packets/bandwidth=1/(1−PER)×length of message/number of bits per packet×(slot per packet+1)×length of slot/bandwidth=1/(1−PER)× length of message/efficiency/bandwidth  [Equation 2]

where, "slot per packet+1" is the summation of the number of slots occupied by one packet plus one slot for a response, "length of slot" is the length of slots at a bit unit, and "efficiency" is a proportion of the amount of information included in one slot. The "efficiency" is the product of the number of bits per packet, the summation of the number of slots occupied by one packet plus one slot, and the length of slot. Table 2 below shows the efficiency of each packet type:

TABLE 2

| Packet Type | Efficiency |
| --- | --- |
| DM1 | 0.10 |
| DH1 | 0.17 |
| DM3 | 0.39 |
| DH3 | 0.59 |
| DM5 | 0.48 |
| DH5 | 0.72 |

The controller 27 controls the packet type selecting portion 29 so that the packet type selecting portion 29 can select the packet type suitable to transmit the next data packet within a minimum time and at an optimum efficiency. The controller 27 controls the packet type selecting portion 29 such that the packet type selecting portion 29 compares the available bandwidths for the respective packet types and selects the packet type having the largest available bandwidth. The available bandwidth is obtained by the calculation portion 25 that multiplies the efficiency of the packet type X by {1−PER(X)}. For example, having the PER(DH5) at 0.3 and PER(DH3) at 0.1, the available bandwidth of the DH3 packet type is, $$\text{Available Bandwidth } (DH3) = \text{Efficiency } (DH3) \times \{1 - PER(DH3)\}$$

$$= 0.59 \times (1 - 0.1) = 0.531,$$

and the available bandwidth of the DH5 packet type is, $$\text{Available bandwidth } (DH5) = \text{Efficiency } (DH5) \times \{1 - PER(DH5)\}$$

$$= 0.72 \times (1 - 0.3) = 0.504$$

Since the available bandwidth (DH3) is larger than the available bandwidth (DH5), it is determined that the DH3 packet type has higher performance than the DH5 packet type. Accordingly, when the situation is like the above, the controller 27 controls the packet type selecting portion 29 to select the DH3 packet type.

In order for the packet type selecting portion 29 to select the suitable packet type, the packet error rates of other packet types have to be calculated in advance. The packet error rates of the other packet types can be derived from the current packet error rate. That is, providing that the bit error rates occur at a uniform distribution (i.e., providing that the bit error rates are independent from each other), and letting BER denote the current bit error rate, bit per packet X denote the amount of data bits of packet type X, the packet error rate can be calculated by the following equation:

$$PER(X) = 1 - (1 - BER)^{\text{amount of data bit of packet type } X}$$

Then, providing that the PER has been measured long enough, the following equation can be derived from the above equation as follows:

$$BER = 1 - (1 - PER(X))^{1/\text{amount of data bit of packet type } X}$$

After obtaining the packet error rate of the packet type X by using the above two equations, the packet error rate of the other packet type Y is calculated by the following equation:

$$PER(Y) = 1 - (1 - BER)^{\text{amount of data bit of packet type } Y}$$

$$= 1 - (1 - PER(X))^{\text{amount of data bit of packet type } Y / \text{amount of data bit of the packet type } X}$$

From the PER(Y) obtained by the above two equations and from the existing PER(X), the available bandwidths for the two packet types can be obtained, and by comparing the PER(Y) and PER(X), it can be determined whether the change of packet type X to the packet type Y is efficient or not.

Figure 5:
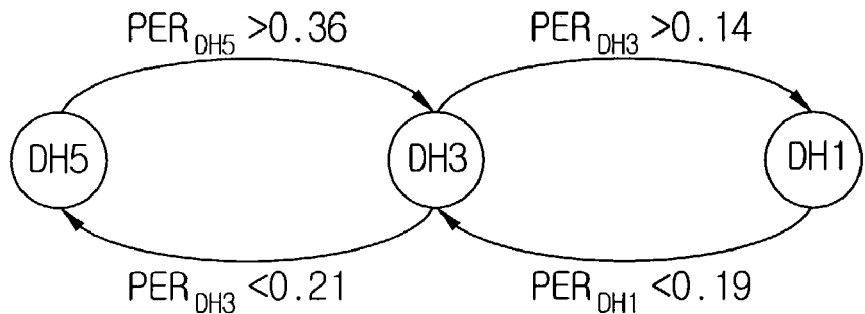
FIG. 5 is a view for explaining the process of packet type shifting by the wireless communication apparatus of FIG. 3.

The change from the packet type X to the packet type Y occurs when the available bandwidth for the packet type Y is greater than the available bandwidth for the packet type X. Such changes between the packet types DH5 and DH3 usually occur in the area where <Available Bandwidth (DH5) =Available Bandwidth (DH3)=0.45>, while the change between the packet types DH3 and DH1 occurs in the area where <Available Bandwidth (DH3)=Available Bandwidth (DH1)=0.15>. Such changing process by the wireless communication apparatus is shown in detail in FIG. 5. Since the available bandwidth is defined as the multiplication of the efficiency of the packet type X by {1−PER(X)}, the packet error rate of the other packet type Y 'PER(Y)' can also be obtained.

The above also applies to the DM packet type. That is, after detecting the bit error rate of the current packet type, the packet error rate of the other packet types can be predicted based on the detected bit error rate. In the DM packet type, five bits of error correction code is added to ten bits of data bit so as to correct one bit error of every kind. Considering this, the successful transmission of DM packet type can be based on a modeling in which no or one error occurs in fifteen (15) bits. This relation can be expressed by the $$PER(X) = 1 - \{(1 - BER)^{15} + 15 \times BER \times (1 - BER)^{14}\}^{size\ of\ packet\ type\ X/10} \quad \text{[Equation 3]}$$

The controller 27 controls the transceiving portion 21 so that the packet type selected by the packet type selecting portion 29 can be transmitted as the next data packet. Further, the controller 27 transmits and receives the data to/from the host 40.

The host 40 serves the original objective of the device to which the wireless communication apparatus 20 is provided. That is, if the device that employs the wireless communication apparatus 20 is a printer, the host 40 performs the original job of the printer, i.e., it performs the printing job. The data, which is required to perform the original job of the device or processed by the device, is controlled by the controller 27 such that the data is transmitted and received with other external devices.

Figure 6:
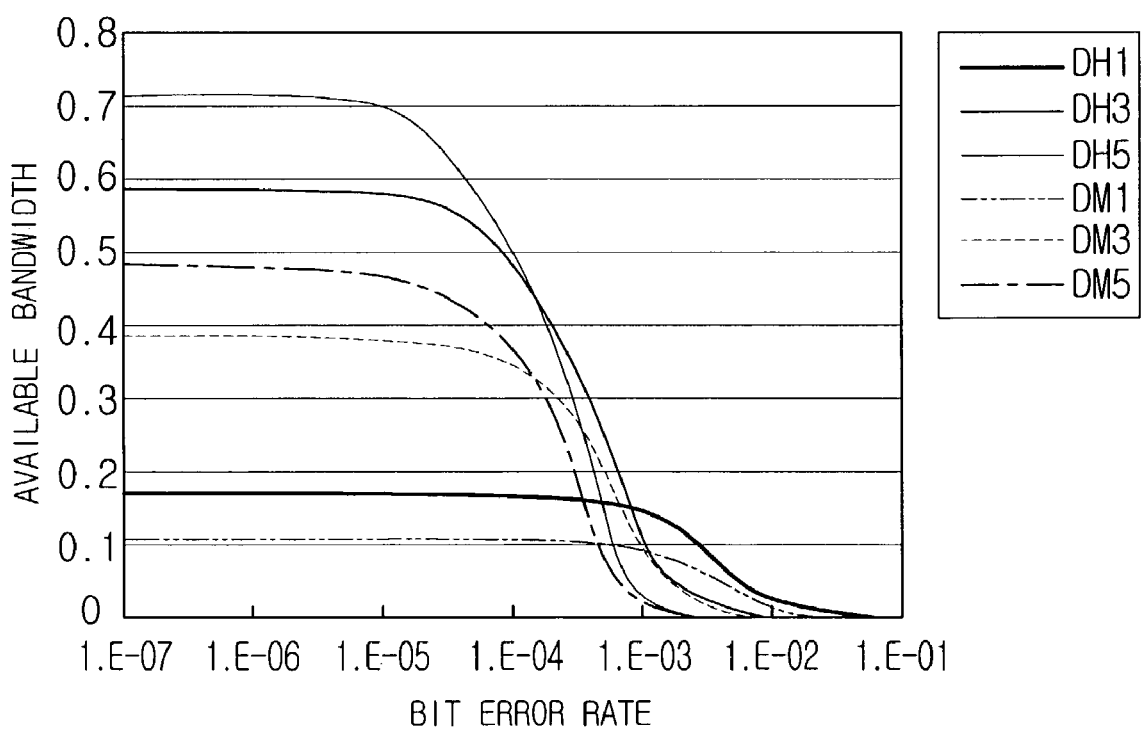
FIG. 6 is a view showing the available bandwidths for the DH and DM packet types for comparison.

FIG. 6 is a view showing the available bandwidths of the DH and DM packet types for comparison. As in the case of DH packet type, the DM packet type also has a certain point where the available bandwidths cross each other according to the bit error rate. There is no case, however, when the available bandwidth of the DM packet type is better than the available bandwidth of the DH packet type of same kind. In other words, the benefit of error correction of the DM packet type is no greater than the benefit that is obtained from the DH packet type that transmits multiple data bits.

Figure 7:
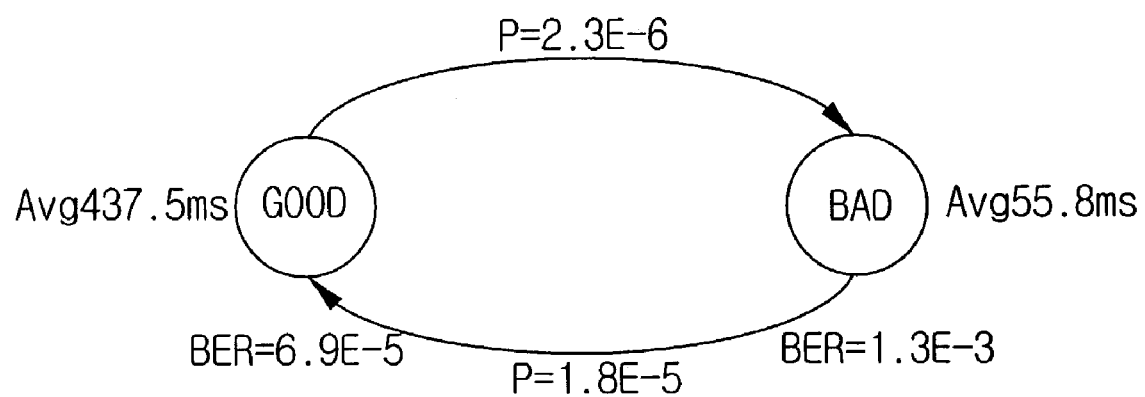
FIG. 7 is a view showing the process of packet type shifting by the wireless communication apparatus of FIG. 3 when there is a lot of error occurring simultaneously.

So far, an approximation of the packet error rate of the other packet types based on an assumption that the bit error rates are distributed on a regular pattern has been obtained. This method, however, would have a somewhat inaccurate result especially when there are errors frequently occurring at the same time. FIG. 7 shows the two states of the Markov process as a representative model of the case where the errors collectively occur at the same time. This model shows two states of the uniform distribution of the bit error rates. One is for the good channel state, and the other is for the bad channel state. In this model, the channels are in good situation most of the times and the bit error rates are low. Except for difference between bit error rates, the bit error rates are distributed uniformly. This suggested model is of the dynamic packet type change, which rapidly changes the status of FIG. 5 to handle the situation of collective occurrence of the errors. However, since the Bluetooth system uses different frequencies for each packet for the packet transmission, the status of the current packet and the next packet is independent from each other. Accordingly, there is a need to change the threshold of transition in order to increase performance of the packet type change. In other words, when there is a change from the current packet type to the next larger packet type, the threshold is increased, while, when there is a change from the current packet type to the next smaller one, the threshold for transition is decreased.

Figure 8:
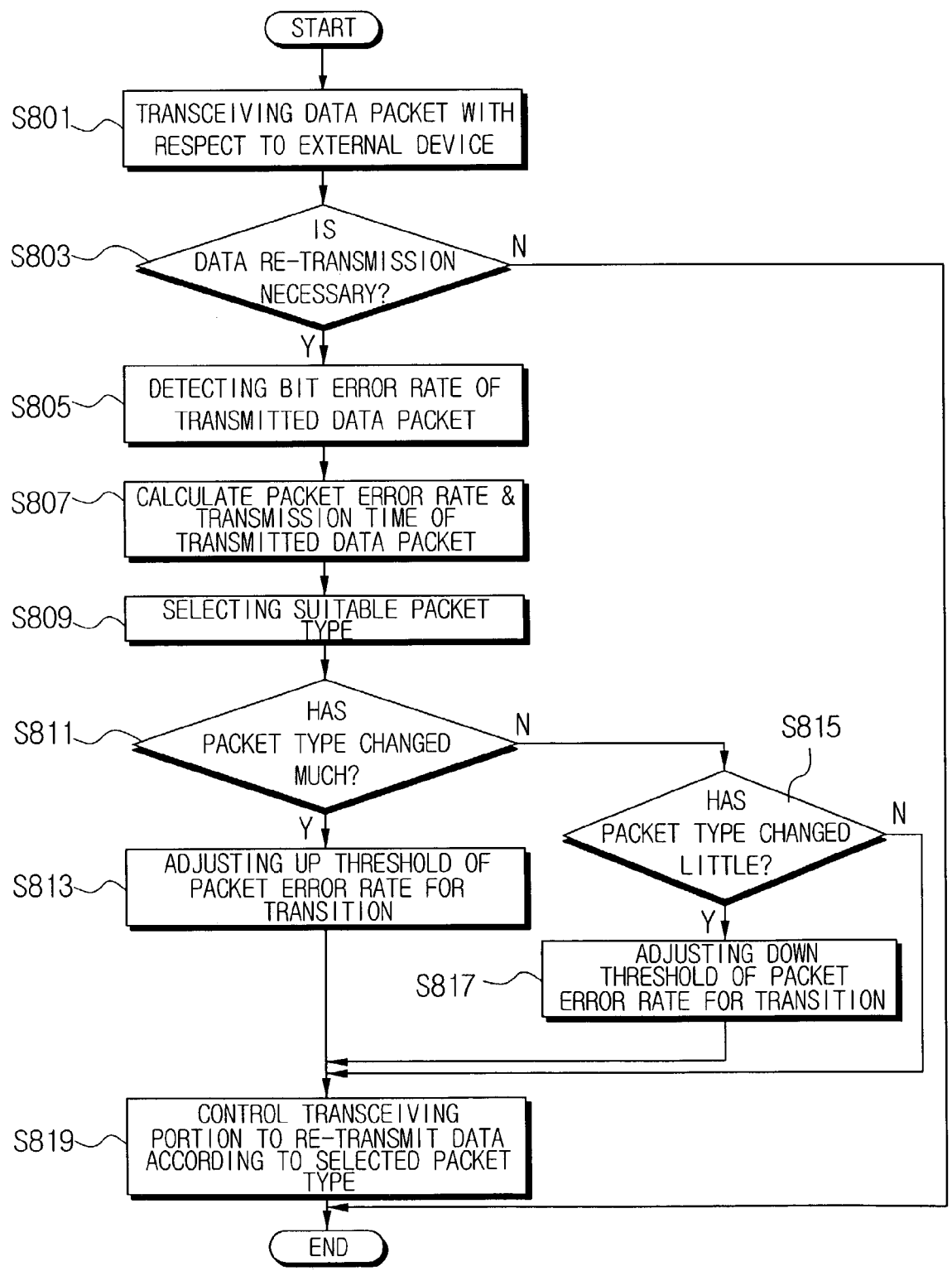
FIG. 8 is a flowchart showing a wireless communication method of FIG. 3.

FIG. 8 is a flowchart showing the wireless communication method of FIG. 3. Referring to FIG. 8, the operation of the wireless communication apparatus according to the present invention will be described below in greater detail.

The transceiving portion 21 transmits and receives the data packet to/from the external device (step S801). The controller 27 determines whether the re-transmission of the data packet is necessary or not, when there is an error occurring in the transmitted packet to the external device (step S803). Since the wireless communication apparatus 20 according to the present invention is not limited to the case where there is an error in the data packet, S803 can be omitted. The detection portion 23 detects the bit error rates of the data packet transmitted to the external device (step S805). The detected bit error rate is transmitted to the calculation portion 25. Then, the calculation portion 25 calculates a packet error rate based on the detected bit error rate by the Equation 1 (step S807). Further, the calculation portion 25 calculates the transmission time of the data packet to the external device, based on the calculated packet error rate (step S807). Based on the packet error rate and transmission time calculated by the calculation portion 25, the controller 27 controls the packet type selecting portion 29 to select the packet type suitable for a transmission within a minimum transmission time and with an optimum efficiency. Under the control of the controller 27, the packet type selecting portion 29 selects the packet type that is most suitable as the next data packet (step S809).

Also, the controller 27 determines if there is an increasing change in the size of the packet type, which is selected by the packet type selecting portion 29, from the previous packet type (step S811). If there is an increasing change, the controller 27 increases the threshold of packet error rate for transition (step S813). If there is a decreasing change (step S815), the controller 27 decreases the packet error rate threshold for transition (step S817).

The controller 27 controls the transceiving portion 21 to transmit the packet type selected by the packet type selecting portion 29 for re-transmission, or as the next data packet.

Figure 9:
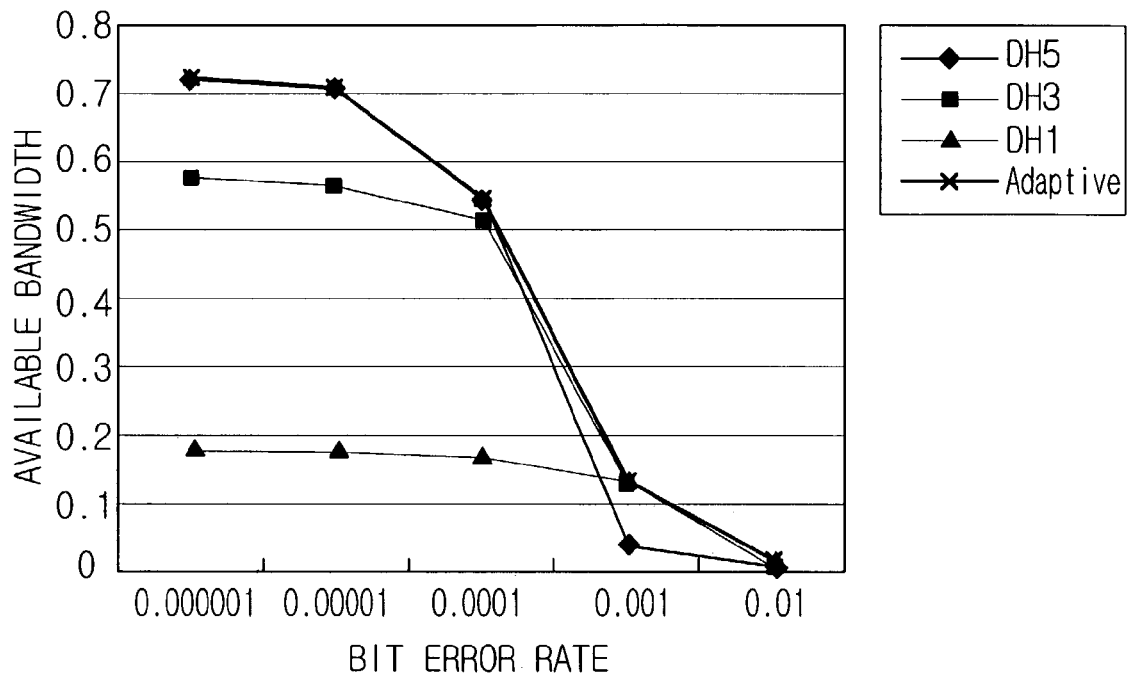
FIG. 9 is a view simulating the situation where the bit errors occur in a uniform pattern.

In order to verify the suggested method, the situation where the bit errors occur in uniform distribution and another situation where the bit errors collectively occur at the same time, are simulated. FIG. 9 shows the graph indicating the bit errors in uniform distribution. Referring to the graph of FIG. 9, it is better to use the DH5 packet type for bit error rates less than $10^{-4}$, while it is better to use the DH3 packet type for bit error rates greater than $10^{-4}$.

Figure 10:
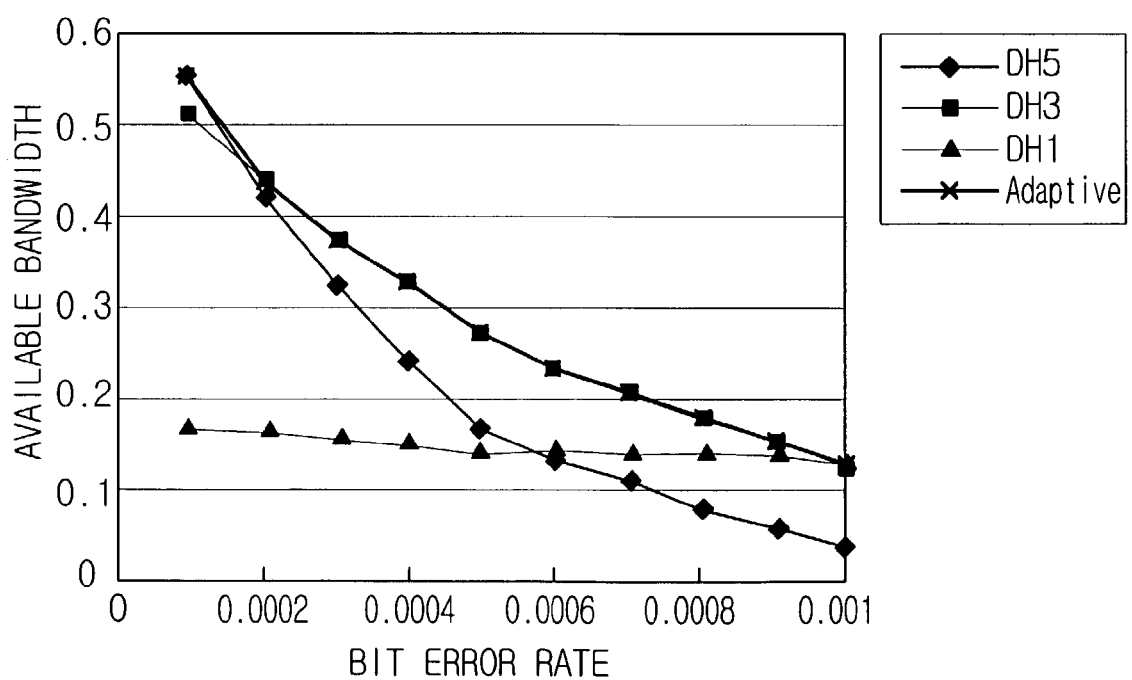
FIG. 10 is a view showing enlargement of a part of the simulation result of FIG. 9.

FIG. 10 is a view showing part of the simulation result of FIG. 9 in enlargement. FIG. 10 shows the region where the bit error rate is between $10^4$ through $10^3$ in enlargement. The result of the simulation is identical to the probability model as described above, because the distribution of the bit errors is identical to the prediction of the method according to the present invention.

Figure 11:
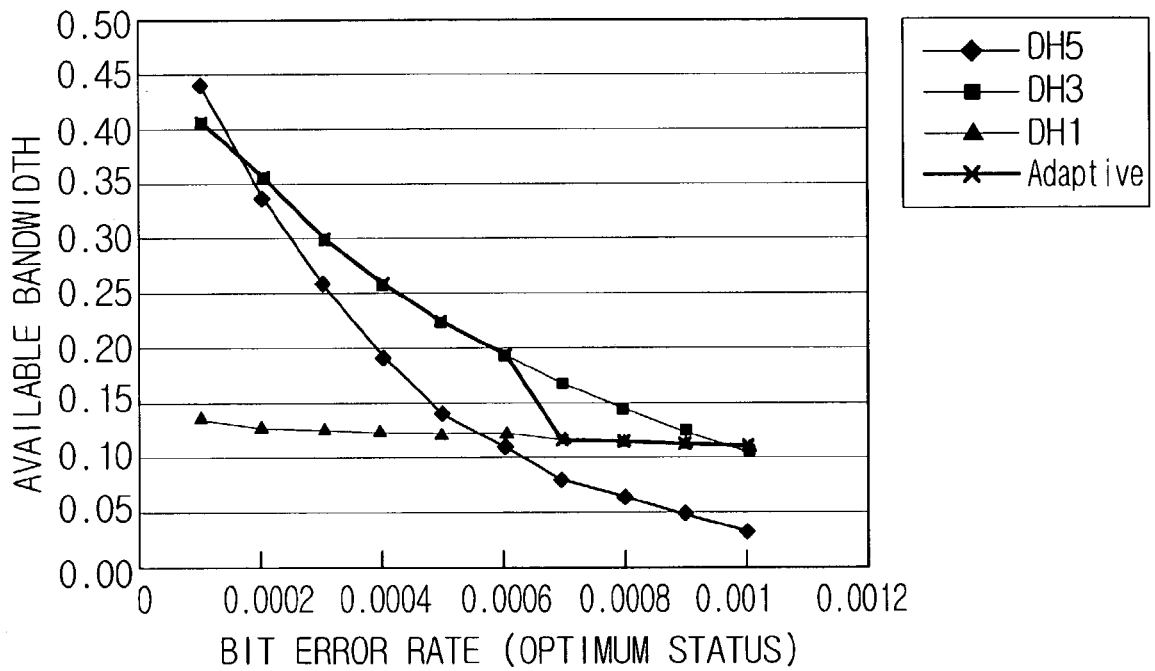
FIG. 11 is a view showing the result of simulation of the bust bit errors.

FIG. 11 is a view showing the result of the simulation of burst bit errors. In other words, FIG. 11 shows the bit errors collectively occurring at the same time by the Markov process of two states. An X-axis of the graph represents the bit error rates under a good condition. It is assumed that the bit error rates under a bad condition are one hundred times as large as the bit error rates under a good condition. Also, it is assumed that the possibility of good condition is 0.8, and the average time of the two states is greater than the slot time. The result of the dynamic transition by fixed threshold shows a result that is not that good at a certain point. For example, under this method, the packet is changed to the DH1 packet type when the bit error rate is 0.0007, while it would show much better performance if the packet remains to be DH3 packet type. Such shortcoming occurs due to differences between the prediction of the suggested method and the true bit error.

Figure 12:
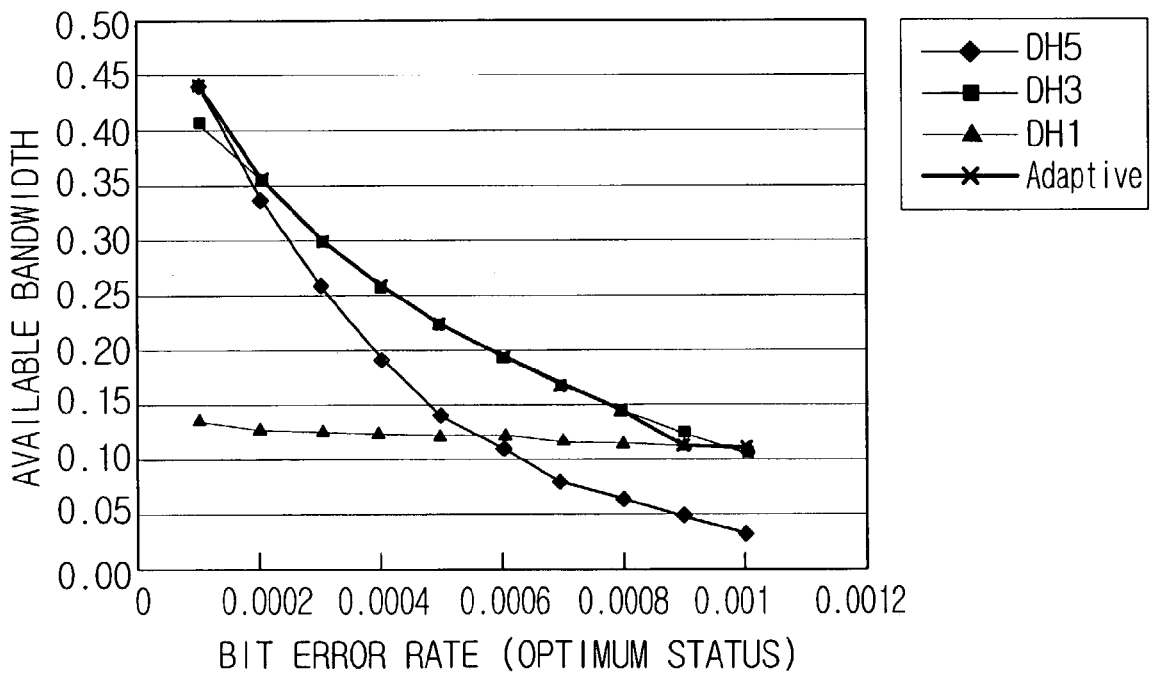
FIG. 12 is a view showing the simulation result that is improved from the result of FIG. 11.

In order to prevent such a difference, the method for adjusting the threshold itself is simulated. FIG. 12 shows the result of the simulation, in which the adjustment of the threshold prevents the undesirable transition.

Accordingly, the wireless communication apparatus according to the present invention can maximize the transmission efficiency since it can transmit the packet while adaptively changing packet type according to the packet error rates.

Not only capable of transmitting the data while adaptively changing the packet type according to the packet error rate, the wireless communication apparatus according to the present invention can also transmit the data selectively when many errors occur at the same time since it is capable of selecting the optimum packet type. As a result, the transmission efficiency is maximized.

While the invention has been shown and described with reference to the preferred embodiment thereof, it will be understood by those skilled in the art that various changes in form and details may be made therein without departing from the sprit and scope of the invention as defined by the appended claims.

What is claimed is:

1. A wireless communication apparatus, comprising:
   a transceiving portion for receiving a first data packet from an external device and transmitting a second data packet to the external device;
   a packet type selecting portion for selecting a packet type for the second data packet;
   a calculation portion for calculating a packet error rate and a transmission time of a transmitted data packet; and
   a control portion for controlling the packet type selecting portion so that a proper packet type can be selected, the proper packet type for a transmission of a next data packet based on the calculated packet error rate and the transmission time within a minimum time and with a maximum efficiency,
   wherein the control portion controls the transceiving portion to transmit the next data packet according to the selected packet type and
   wherein the control portion adjusts a threshold of the packet error rate for a transition according to the change of the packet type.

2. The wireless communication apparatus of claim 1, further comprising a detection portion for detecting a bit error rate of the transmitted data packet, wherein the calculation portion calculates a packet error rate of a packet type X based on the detected bit error rate according to the following equation:

$$PER(X) = 1 - (1-BER)^{amount\ of\ data\ bit\ of\ packet\ type\ X}$$

where PER(X) is the packet error rate of the packet type X, and BER is a current bit error rate.

3. The wireless communication apparatus of claim 2, wherein the calculation portion calculates a packet error rate of a packet type Y based on the calculated packet error rate of the packet type X according to the following equation:

$$PER(Y) = 1 - (1-BER)^{amount\ of\ data\ bit\ of\ packet\ type\ Y}$$
$$= 1 - (1-PER(X))^{amount\ of\ data\ bit\ of\ packet\ type\ Y / amount\ of\ data\ bit\ of\ the\ packet\ type\ X}$$

where PER(Y) is the packet error rate of the packet type Y.

4. The wireless communication apparatus of claim 3, wherein the calculation portion calculates the transmission time by the following equation:

Transmission time=$1/(1-PER)$×number of packets× length of packets/bandwidth =$1/(1-PER)$×length of message/number of bits per packet×(slot per packet+1)×length of slot/bandwidth=$1/(1-PER)$× length of message/efficiency/bandwidth, where "slot per packet+1" is a summation of a number of slots occupied by one packet plus one slot for a response,
"length of slot" is a length of slots at a bit unit, and
"efficiency" is a proportion of amount of information included in one slot.

5. The wireless communication apparatus of claim 4, wherein the control portion is a controller for further controlling the packet type selecting portion to select a packet type of largest available bandwidth by comparing available bandwidths of the respective packet types.

6. The wireless communication apparatus of claim 5, wherein the available bandwidth is obtained by multiplying an efficiency of the packet type X by the $\{1-PER(X)\}$.

7. The wireless communication apparatus of claim 6, wherein the controller adjusts up a threshold of the packet error rate for a transition when the selected packet type is bigger than a previous packet type.

8. The wireless communication apparatus of claim 6, wherein the controller adjusts down a threshold of the packet error rate for a transition when the selected packet type is smaller than a previous packet type.

9. The wireless communication apparatus of claim 1, wherein the calculation portion calculates a packet error rate of a packet type X based on a detected bit error rate according to the following equation:

$$PER(X)=1-(1BER)^{amount\ of\ data\ bit\ of\ packet\ type\ X}$$

where PER(X) is the packet error rate of the packet type X, and BER is a current bit error rate.

10. The wireless communication apparatus of claim 1, wherein the calculation portion calculates a packet error rate of a packet type X based on at least the following:

$$(1-BER)^{amount\ of\ data\ bit\ of\ packet\ type\ X}$$

where BER is a current bit error rate.

11. The wireless communication apparatus of claim 1, wherein the first and the second data packets comply with the Bluetooth protocol.

12. The wireless communication apparatus of claim 1, wherein the selected packet type is one of a plurality of predetermined packet types.

13. The wireless communication apparatus of claim 1, wherein the packet error rate is calculated based on a bit error rate.

14. The wireless communication apparatus of claim 1, wherein
the calculated packet error rate is a first calculated packet error rate of a first type packet,
the calculation portion calculates a second calculated packet error rate of a second type packet, and
the control portion controls the packet type selecting portion to select one of the first type packet and the second type packet as the proper packet type for transmission based on a comparison of the first calculated packet error rate and the second calculated packet error rate.

15. A wireless communication method, comprising the steps of:
transmitting a first data packet to an external device, and receiving a second data packet from the external device;
calculating a packet error rate and a transmission time of the transmitted data packet;
selecting a packet type for a transmission of a next data packet based on the packet error rate and for the transmission within a minimum time and with a maximum efficiency; and
controlling to transmit the next data packet according to the selected packet type,
wherein the controlling adjusts threshold of the packet error rate for a transition according to the change of the packet type.

16. The wireless communication method of claim 15, further comprising a step of detecting a bit error rate of the transmitted data packet, wherein the calculating step calculates a packet error rate of a packet type X based on the detected bit error rate according to the following equation:

$$PER(X)=1-(1-BER)^{amount\ of\ data\ bit\ of\ packet\ type\ X}$$

where PER(X) is the packet error rate of the packet type X, and BER is a current bit error rate.

17. The wireless communication method of claim 16, wherein the calculating step calculates a packet error rate of a packet type Y based on the calculated packet error rate of the packet X according to the following equation:

$$PER(Y) = 1 - (1-BER)^{amount\ of\ data\ bit\ of\ packet\ type\ Y}$$
$$= 1 - (1-PER(X))^{amount\ of\ data\ bit\ of\ packet\ type\ Y/amount\ of\ data\ bit\ of\ the\ packet\ type\ X}$$

where PER(Y) is the packet error rate of the packet type Y.

18. The wireless communication method of claim 17, wherein the calculating step calculates the transmission time by the following equations:

Transmission time=1/(1−PER)×number of packets× length of packets/bandwidth =1/(1−PER)×length of message/number of bit per packet×(slot per packet +1)×length of slot/bandwidth=1/(1−PER)×length of message/efficiency/bandwidth where "slot per packet +1" is a summation of a number of slots occupied by one packet plus one slot for a response,
"length of slot" is a length of slots at a bit unit, and
"efficiency" is a proportion of amount of information included in one slot.

19. The wireless communication method of claim 18, wherein the selecting step further comprises selecting a packet type of largest available bandwidth by comparing available bandwidths of the respective packet types.

20. The wireless communication method of claim 19, wherein the available bandwidth is obtained by multiplying an efficiency of the packet type X by the {1−PER(X)}.

21. The wireless communication method of claim 20, further comprising a step of adjusting up a threshold of the packet error rate for a transition when the selected packet type is bigger than a previous packet type.

22. The wireless communication method of claim 20, further comprising a step of adjusting down a threshold of the packet error rate for a transition when the selected packet type is smaller than a previous packet type.

23. The wireless communication method of claim 15, wherein the calculating step calculates a packet error rate of a packet type X based on a detected bit error rate according to the following equation:

$$PER(X)=1-(1-BER)^{amount\ of\ data\ bit\ of\ packet\ type\ X}$$

where PER(X) is the packet error rate of the packet type X, and BER is a current bit error rate.

24. The wireless communication method of claim 15, wherein the calculating step calculates a packet error rate of a packet type X based on at least the following:

$$(1-BER)^{amount\ of\ data\ bit\ of\ packet\ type\ X}$$

where BER is a current bit error rate.

25. The wireless communication method of claim 15, wherein the first and the second data packets comply with the Bluetooth protocol.

26. The wireless communication method of claim 15, wherein the selected packet type is one of a plurality of predetermined packet types.

27. The wireless communication method of claim 15, wherein the packet error rate is calculated based on a bit error rate.

28. The wireless communication method of claim 15, wherein the packet error rate is a first packet error rate of a first type packet, the calculating calculates a second packet error rate of a second type, and the selecting selects one of the first type packet and the second type packet as the packet type for the transmission based on a comparison of the first packet error rate and the second packet error rate.

* * * * *